(12) United States Patent
Reis

(10) Patent No.: US 11,594,872 B2
(45) Date of Patent: Feb. 28, 2023

(54) DEVICE, SYSTEM AND METHOD FOR ELECTRICAL ARC SUPPRESSION ON A POWER RAIL

(71) Applicant: TORONTO TRANSIT COMMISSION, Toronto (CA)

(72) Inventor: Marcus Reis, Mississauga (CA)

(73) Assignee: TORONTO TRANSIT COMMISSION, Toronto (CA)

(*) Notice: Subject to any disclaimer, the term of this patent is extended or adjusted under 35 U.S.C. 154(b) by 673 days.

(21) Appl. No.: 16/598,767

(22) Filed: Oct. 10, 2019

(65) Prior Publication Data

US 2020/0119541 A1 Apr. 16, 2020

Related U.S. Application Data

(60) Provisional application No. 62/746,380, filed on Oct. 16, 2018.

(51) Int. Cl.
*B60M 5/00* (2006.01)
*H02H 3/16* (2006.01)
*B60L 5/39* (2006.01)
*B60M 1/04* (2006.01)

(52) U.S. Cl.
CPC ............... *H02H 3/16* (2013.01); *B60L 5/39* (2013.01); *B60M 1/04* (2013.01); *B60M 5/00* (2013.01); *B60L 2200/26* (2013.01)

(58) Field of Classification Search
CPC ......... H02H 3/16; B60L 5/39; B60L 2200/26; B60M 1/04; B60M 5/00
See application file for complete search history.

(56) References Cited

U.S. PATENT DOCUMENTS

2008/0021602 A1 1/2008 Kingham

FOREIGN PATENT DOCUMENTS

| EP | 1339562 A1 | * | 9/2003 | ............. B60M 1/18 |
| EP | 1339562 B1 | | 7/2004 | |
| EP | 2649703 A2 | * | 10/2013 | ............. B60L 9/005 |

* cited by examiner

*Primary Examiner* — Robert J McCarry, Jr.
(74) *Attorney, Agent, or Firm* — Norton Rose Fulbright Canada LLP

(57) ABSTRACT

A direct current (DC) traction power electric arc suppressing device is provided. The device comprises a parallel resistor-capacitor (RC) circuit electrically connected between a main traction power rail and an associated power rail incline end section with a narrow insulating joint installed between the main traction power rail and the associated power rail end section incline.

14 Claims, 4 Drawing Sheets

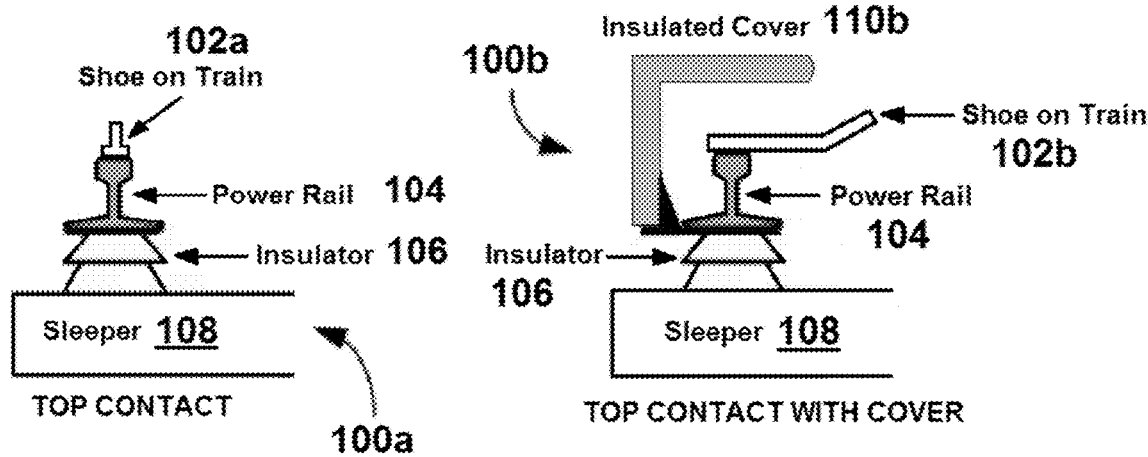
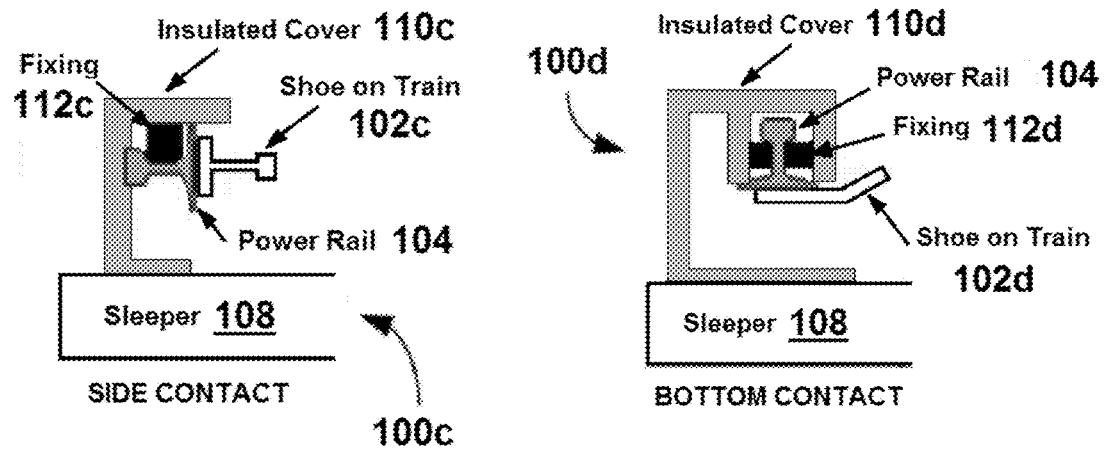
FIG. 1A Prior Art
FIG. 1B Prior Art
FIG. 1C Prior Art
FIG. 1D Prior Art
Types of Power Rail Contact System

DEVICE, SYSTEM AND METHOD FOR ELECTRICAL ARC SUPPRESSION ON A POWER RAIL

CROSS-REFERENCE TO RELATED APPLICATIONS

This application claims all benefit including priority to U.S. Provisional Patent Application 62/746,380, filed Oct. 16, 2018, and entitled "System and Method for Electrical Arc Suppression on a Transit System" which is hereby incorporated by reference in its entirety.

FIELD

This disclosure generally relates to the field of traction power rail system, and in particular to a device and system for electrical arc suppression in a traction power rail.

BACKGROUND

Traction power rail (sometimes referred to as third rail or power rail) distribution systems provide direct current (DC) traction power, along the railway, to subway, urban transportation trains and some light rail systems. The electric traction power current is transferred to the train's propulsion power systems via collector shoe(s) on the side of each train propulsion car. The collector shoe makes contact with a power rail, collecting electrical power, while sliding along the power (conductor) rail. Power rails have long but finite lengths (feeding sections) and gaps (section gaps) exist between successive power rail feeding sections. Each collector shoe disengages and disconnects from the power rail when it slides over the section gaps which can produce electric arcing due to the interruption of the collector shoe traction power current. The electric arcing may lead to undesirable fire hazard at track level areas affected by combustible litter or dry leaves accumulation.

SUMMARY

In accordance with one embodiment, there is provided a direct current (DC) traction power electric arc suppressing device. The device comprises a parallel resistor-capacitor (RC) circuit electrically connected between a main traction power rail and an associated power rail incline end section. An insulating joint is installed between the main traction power rail and the associated power rail end section incline.

DESCRIPTION OF THE FIGURES

Embodiments will be described, by way of example only, with reference to the attached figures, wherein in the figures:

FIGS. 1A-1D illustrate, in component diagrams, examples of a traction power rail contact systems;

It is understood that throughout the description and figures, like features are identified by like reference numerals.

DETAILED DESCRIPTION

Figure 2:
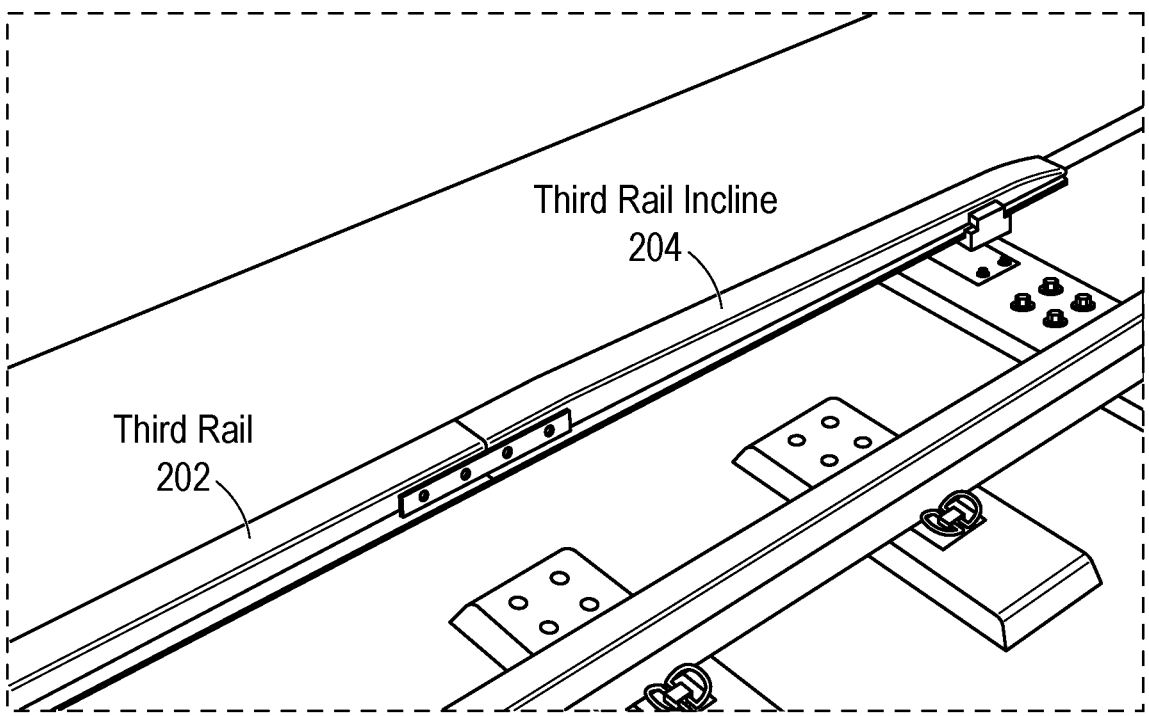
FIG. 2 illustrates an example of a power rail and a power rail incline in a conductor rail contact system.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various example embodiments described herein.

Traction power rail distribution systems provide direct current (DC) traction power, along the railway, to subway, urban transportation trains and some light rail systems. The electric traction power current is transferred to the train's propulsion power systems via collector shoe(s) on the side of each train propulsion car. The collector shoe makes contact with a power rail, collecting electrical power, while sliding along the power (conductor) rail. Power rails have long but finite lengths (feeding sections) and gaps (section gaps) exist between successive power rail feeding sections. Each collector shoe disengages and disconnects from the power rail when it slides over the section gaps which can produce electric arcing due to the interruption of the collector shoe traction power current. The electric arcing may lead to undesirable fire hazard at track level areas affected by combustible litter or dry leaves accumulation.

The present invention pertains to an electric arc suppressing device which is connected at the section gap ends of traction power (conductor) rails affected by electric arcing.

FIG. 1A illustrates, in a component diagram, an example of a top contact power rail contact system 100a. In the top contact power rail contact system 100a, a shoe 102a on a train is in contact with a rail 104 such that the shoe 102a is on top of the rail 104. An insulator 106 supports the rail 104 over a sleeper 108.

FIG. 1B illustrates, in a component diagram, an example of a top contact with cover power rail contact system 100b. In the top contact with cover power rail contact system 100b, a shoe 102b on a train is in contact with the rail 104 such that the shoe 102b is on top of the rail 104. The insulator 106 supports the rail 104 over the sleeper 108. An insulated cover 110b covers the top of the area where the shoe 102b comes into contact with the rail 104.

FIG. 1C illustrates, in a component diagram, an example of a side contact power rail contact system 100c. In the side contact power rail contact system 100c, a shoe 102c on a train is in contact with the rail 104 such that the shoe 102c is next to a side of the rail 104. An insulated cover 110c covers the top of the area where the shoe 102c comes into contact with the rail 104. A fixing 112c is between the insulated cover and the rail 104.

FIG. 1D illustrates, in a component diagram, an example of a bottom contact power rail contact system 100d. In the bottom contact power rail contact system 100d, a shoe 102d on a train is in contact with the rail 104 such that the shoe 102d is below the rail 104. An insulated cover 110d covers the top and sides of the rail 104. A fixing 112d is between the insulated cover 110d and the sides of the rail 104.

For ease of discussion, the collector shoes 102a, 102b, 102c, 102d will be collectively referred to as collector shoe 102.

FIG. 2 illustrates an example of a power rail 202 and a power rail incline 204 in a power rail contact system. Power rails 202 are interrupted at section gaps and ramps (i.e., power rail inclines) 204 at the end of the power rail sections to provide a smooth transition to each train collector shoe 102.

Figure 3:
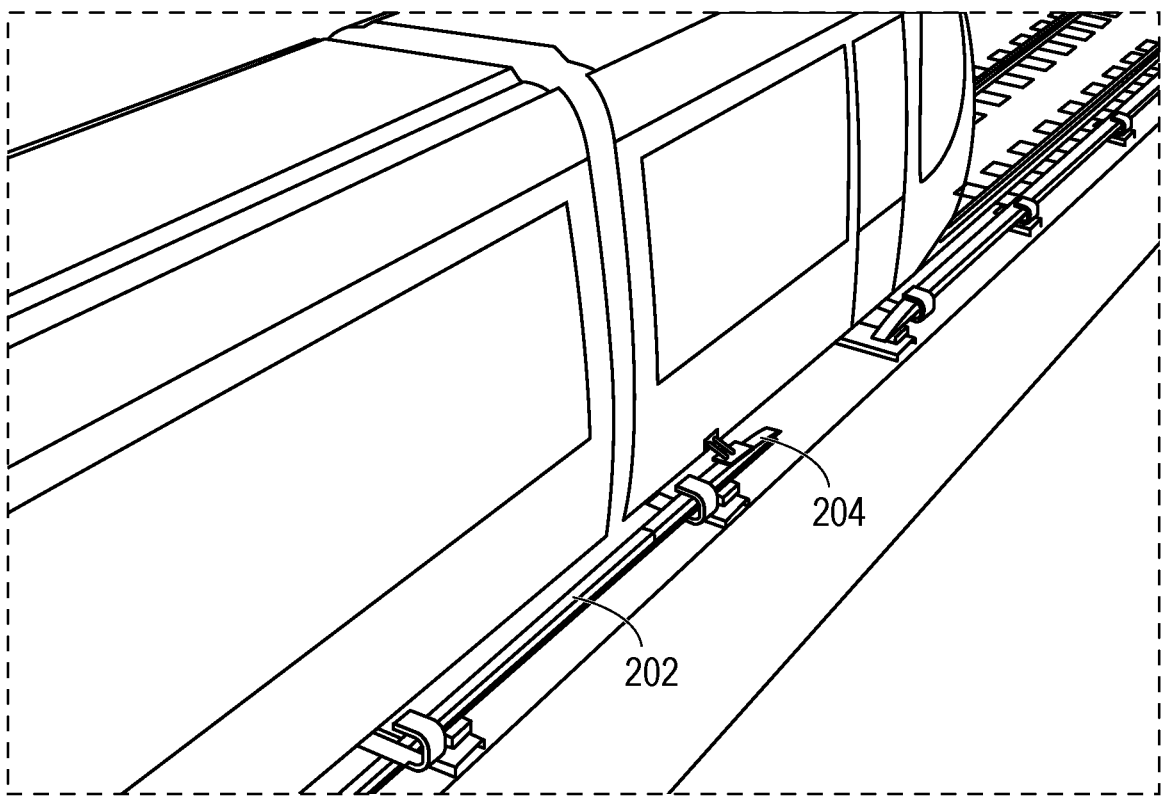
FIG. 3 illustrates an example of a train travelling over a power rail contact system.

FIG. 3 illustrates an example of a train travelling over a power rail contact system. When a collector shoe 120 disconnects from a power rail incline (ramp) 204 electric arcing (not shown) can be produced during the interruption of the train DC traction power current.

Figure 4:
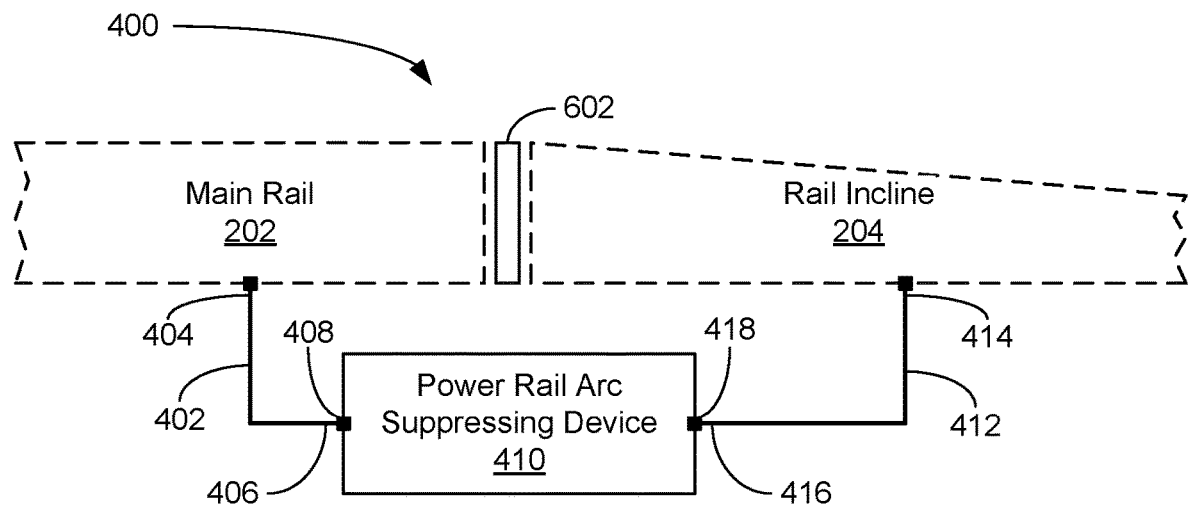
FIG. 4 illustrates, in a component diagram, an example of the power rail arc suppressing apparatus, in accordance with some embodiments.

FIG. 4 illustrates the power rail arc suppressing device apparatus 400, in accordance with some embodiments. The power rail arc suppressing device installation comprises a first conductor cable 402 connected between the main power rail 202 and the power rail arc suppressing device 410 input terminal 408, as well as a second conductor cable 412 connected between the power rail arc suppressing device 410 output terminal 418 and the power rail incline 204. The main power rail 202 is electrically insulated from the power rail incline 204 by means of an insulating joint or air gap 602 that is narrower than the train collector shoe width.

Figure 5:
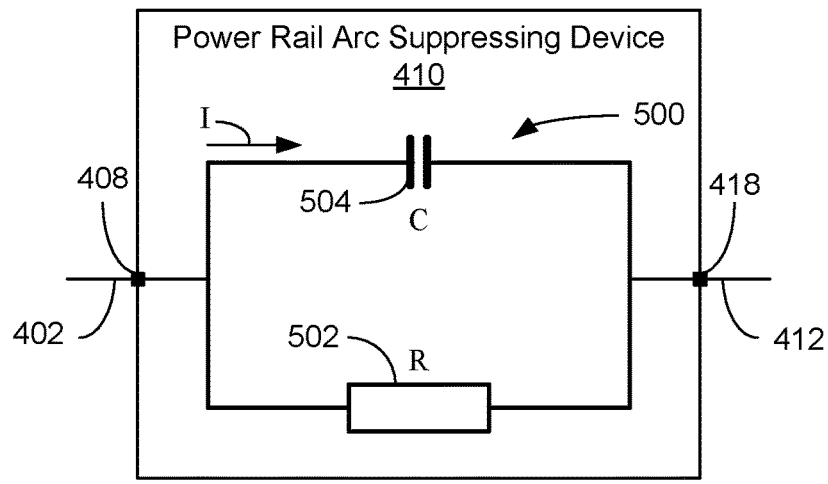
FIG. 5 illustrates the power rail arc suppressing device schematic diagram, in accordance with some embodiments.

FIG. 5 illustrates the power rail arc suppressing device 410 schematic diagram, in accordance with some embodiments. The power rail arc suppressing device 410 comprises at least one capacitor or capacitor bank 504, and at least one resistor or resistor bank 502 forming a passive parallel resistor-capacitor (RC) circuit 500 with a Time Constant (TC=R×C) less than one (1) second, provided the capacitance (or total capacitance) is less than one (1) Farad, and resistance (or total resistance) is greater than one (1) Ohm. A DC rated circuit breaker or fused disconnect switch may be included for electrical protection and/or isolation of the RC circuit for servicing. The power rail arcing suppressing device 410 is a wayside electric DC traction power anti-arcing circuit that suppresses the electric arcing produced at the power rail section gap incline 204 when the train collector shoe 102 disconnects from the power rail 202. Since the device electric circuit 500 is passive, it does not require auxiliary supply power to operate. The power rail arc suppressing device circuit 500 operates by reducing or suppressing the train collector shoe traction power DC current before the collector shoe 102 disconnects from the power rail incline 204. Thus, arcing is suppressed as the collector shoe disconnects under minimal current.

The initially discharged capacitor 504 conducts the train collector shoe 102 traction power current when the collector shoe 102 electrically transitions (switches) from the main rail 202 to the rail incline 204. The collector shoe 102 makes (connects) to the rail incline 204 before it breaks (disconnects) from the main rail 202, as the insulating joint 602 is narrower than the collector shoe 102 width. The collector shoe 102 current rapidly charges (or may substantially charge) the capacitor 504 which ceases to conduct (once fully charged), thereby quickly suppressing the collector shoe traction power current just before the collector shoe 102 begins disconnecting from the rail incline 204. Consequently, arcing is suppressed during the collector shoe 102 disconnection period as it disconnects with minimal current. The parallel resistor 502 discharges the capacitor 504 before the approach/arrival of any subsequent train collector shoe 102. The electrical resistance of resistor 502 is such that its parallel let through current contribution to the total collector shoe 102 current is small enough not to produce any significant electric arcing when the collector shoe 102 begins disconnecting from the rail incline 204.

Figure 6:
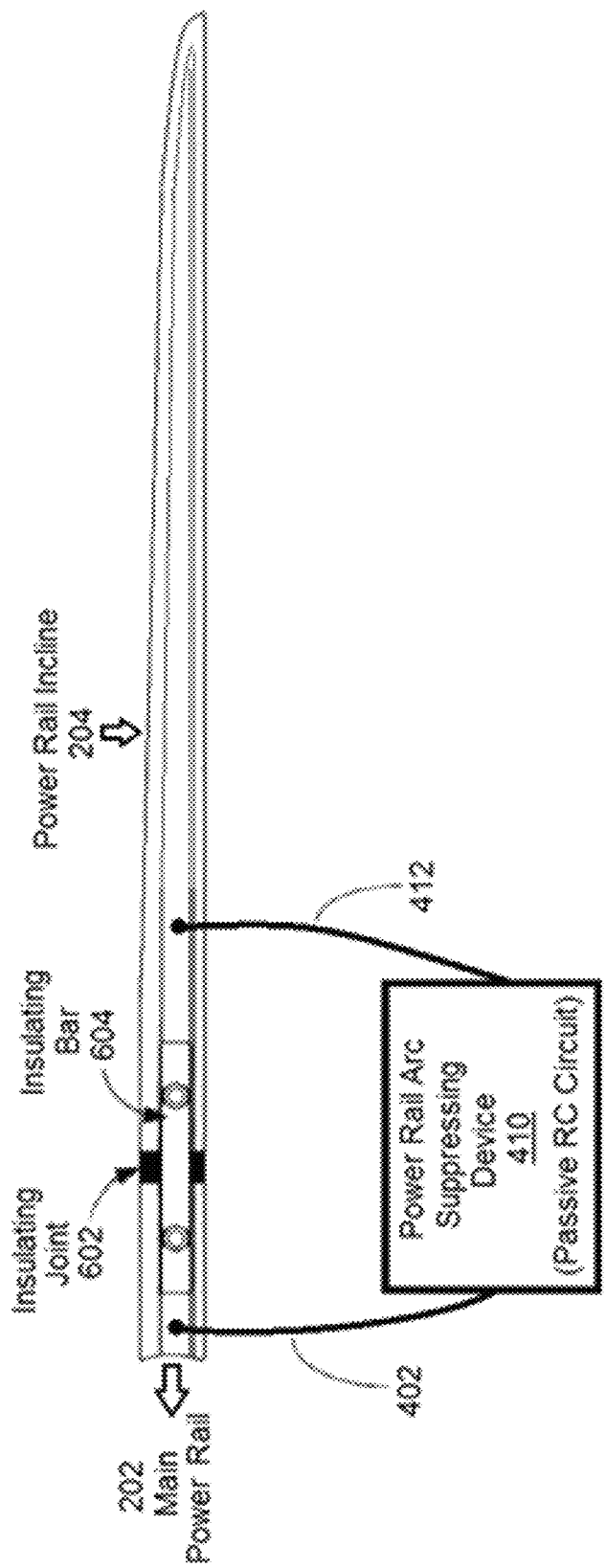
FIG. 6 illustrates details of the power rail arc suppressing device power rail insulating joint installation, in accordance with some embodiments.

FIG. 6 illustrates an example of the power rail arc suppressing device 410 traction power rail insulating joint installation, in accordance with some embodiments. The device 410 is connected between the main power rail 202 and the rail incline section 204. Insulating bars 604 (one bar per rail web side) mechanically secures/ties the main power rail 202 and the rail incline 204. The insulating bars 604 (one bar per rail web side) have their first end affixed (e.g., bolted) to the main third rail 202 and their second end affixed (e.g., bolted) to the rail incline 204. An insulating joint (or narrow air gap) 602 narrower than the collector shoe width is placed/inserted between the main power rail 202 and the power rail incline 204 so that the power rail incline 204 and the main power rail 202 are electrically connected via the power rail arc suppressor 410 circuit. In some embodiments, the power rail incline 204 and the main power rail 202 are electrically connected only via the power rail arc suppressor 410 circuit.

The foregoing discussion provides example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct electrical bonding/connection or direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, processes and steps described in the specification. As one of ordinary skill in the art will readily appreciate from the disclosure of the present invention, processes, machines, manufacture, compositions of matter, means, processes, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, processes, or steps.

As can be understood, the examples described above and illustrated are intended to be exemplary only. The scope is indicated by the appended claims.

The invention claimed is:

1. A direct current (DC) traction power electric arc suppressing device comprising:
   a parallel resistor-capacitor (RC) circuit electrically connected between a main traction power rail and an associated power rail incline end section;
   an insulating feature installed between the main traction power rail and the associated power rail end incline section; and
   one of:
      a DC rated circuit breaker;
      a fused disconnect switch; or an unfused disconnect switch;
to allow for electrical protection and/or isolation of the parallel RC circuit for servicing.

2. The device as claimed in claim 1, further comprising:
a first conductor cable connected between the main power rail and the input terminal of the power rail arc suppressing device; and
a second conductor cable connected between the output terminal of the power rail arc suppressing device and the power rail incline end section.

3. The device as claims in claim 2, wherein the first conductor cable is comprised of multiple conductor cables.

4. The device as claims in claim 2, wherein the second conductor cable is comprised of multiple conductor cables.

5. The device as claimed in claim 1, wherein:
the insulating feature is narrower than the train collector shoe width;
the moving train collector shoe connects to the power rail incline end section before it disconnects from the main power rail; and
the moving train collector shoe current flows through the parallel RC circuit when the collector shoe reaches the power rail end section incline.

6. The device as claimed in claim 1, wherein the parallel RC circuit comprises at least one of:
a capacitor; or
a capacitor bank;
connected in parallel with at least one of:
a resistor; or
a resistor bank.

7. The device as claimed in claim 6, wherein:
a Time Constant of the RC circuit (TC=R×C) is less than one (1) second;
the capacitance (C) is less than one (1) Farad; and
the resistance (R) is greater than one (1) Ohm.

8. The device as claimed in claim 6, wherein the total capacitance of the capacitor or the capacitor bank is less than one (1) Farad.

9. The device as claimed in claim 6, wherein the total resistance of the resistor or the resistor bank is greater than one (1) Ohm.

10. The device as claimed in claim 1, wherein the insulating feature is further associated with:
a first insulating bar on one rail web side, a first end of said first insulating bar affixed to the main power rail and a second end of said first insulating bar affixed to the rail incline; and
a second insulating bar on an opposing rail web side, a first end of said second insulating bar affixed to the main power rail and a second end of said second insulating bar affixed to the rail incline;
wherein said insulating bars mechanically secure the main power rail and the rail incline end section maintaining electrical insulation between the two rails.

11. The device as claimed in claim 1, wherein the insulating feature is a joint.

12. The device as claimed in claim 1, wherein the insulating feature is an insulating air gap.

13. The device as claimed in claim 1, wherein the power rail incline and the main power rail are electrically connected via the power rail arc suppressor circuit.

14. The device as claimed in claim 1, wherein the power rail incline and the main power rail are electrically connected only via the power rail arc suppressor circuit.

* * * * *